US012400393B2

(12) United States Patent
Xu et al.

(10) Patent No.: US 12,400,393 B2
(45) Date of Patent: Aug. 26, 2025

(54) METHOD AND SYSTEM FOR RENDERING PANORAMIC VIDEO

(71) Applicant: SHANGHAI BILIBILI TECHNOLOGY CO., LTD., Shanghai (CN)

(72) Inventors: Huan Xu, Shanghai (CN); Zhaoxin Tan, Shanghai (CN); Hao Liu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 268 days.

(21) Appl. No.: 18/038,407

(22) PCT Filed: Aug. 12, 2021

(86) PCT No.: PCT/CN2021/112332
§ 371 (c)(1),
(2) Date: May 23, 2023

(87) PCT Pub. No.: WO2022/110903
PCT Pub. Date: Jun. 2, 2022

(65) Prior Publication Data
US 2024/0005591 A1    Jan. 4, 2024

(30) Foreign Application Priority Data

Nov. 25, 2020   (CN) .......................... 202011339582.8

(51) Int. Cl.
G06T 15/20   (2011.01)
G06T 15/04   (2011.01)
G06T 19/20   (2011.01)

(52) U.S. Cl.
CPC ............ *G06T 15/205* (2013.01); *G06T 15/04* (2013.01); *G06T 19/20* (2013.01); *G06T 2200/24* (2013.01); *G06T 2219/2016* (2013.01)

(58) Field of Classification Search
None
See application file for complete search history.

(56) References Cited

U.S. PATENT DOCUMENTS 6,147,709 A * 11/2000 Martin .................... H04N 5/272
                                                    348/240.99
9,986,221 B2 * 5/2018 Zhou ....................... G06F 3/012
(Continued)

FOREIGN PATENT DOCUMENTS

CN   104012088 A    8/2014
CN   105163158 A   12/2015
(Continued)

OTHER PUBLICATIONS

International Patent Application No. PCT/CN2021/112332; Int'l Search Report; dated Nov. 5, 2021; 3 pages.
(Continued)

*Primary Examiner* — Jason A Pringle-Parker
(74) *Attorney, Agent, or Firm* — BakerHostetler

(57) ABSTRACT

The present application discloses a method for rendering a panoramic video. The method includes obtaining a current frame of image from a video source, and generating texture map data, where the generating texture map data comprises determining a viewpoint region based on a field of view of a perspective camera, and rendering image pixels outside the viewpoint region at a lower resolution than rendering image pixels within the viewpoint region; mapping the current frame of image to a three-dimensional image based on a (Continued)

spherical rendering model the texture map data; and projecting the three-dimensional image onto a two-dimensional screen.

20 Claims, 8 Drawing Sheets

(56) References Cited

U.S. PATENT DOCUMENTS

| | | | | |
|---|---|---|---|---|
| 2010/0146085 | A1* | 6/2010 | Van Wie | H04L 65/764 709/224 |
| 2015/0058102 | A1* | 2/2015 | Christensen | G11B 31/006 705/14.6 |
| 2016/0105475 | A1* | 4/2016 | Goodman | G06F 3/0487 715/810 |
| 2016/0260196 | A1* | 9/2016 | Roimela | G02B 27/0172 |
| 2016/0353090 | A1 | 12/2016 | Esteban et al. | |
| 2019/0158815 | A1* | 5/2019 | He | H04N 21/234345 |

FOREIGN PATENT DOCUMENTS

| | | |
|---|---|---|
| CN | 105487848 A | 4/2016 |
| CN | 105913478 A | 8/2016 |
| CN | 106131535 A | 11/2016 |
| CN | 106296819 A | 1/2017 |
| CN | 107251567 A | 10/2017 |
| CN | 107516335 A | 12/2017 |
| CN | 108174174 A | 6/2018 |
| CN | 108616731 A | 10/2018 |
| CN | 108702454 A | 10/2018 |
| CN | 109076253 A | 12/2018 |
| CN | 109087260 A | 12/2018 |
| CN | 109242943 A | 1/2019 |
| CN | 109766011 A | 5/2019 |
| CN | 110280014 A | 9/2019 |
| CN | 110347265 A | 10/2019 |
| CN | 111107419 A | 5/2020 |
| CN | 111198610 A | 5/2020 |
| CN | 111290581 A | 6/2020 |
| CN | 111813290 A | 10/2020 |
| CN | 112465939 A | 3/2021 |

OTHER PUBLICATIONS

Zhou Yang; "Parallel Rendering Solid Polylines and Single-colored Polygons on the Terrain Surface"; Nanjing University; Thesis; May 2014; 73 pages (*contains English Abstract see pages III and IV*).

Zhou Yang; "Parallel Rendering Solid Polylines and Single-colored Polygons on the Terrain Surface"; Dept. of Geographical Information Science; Nanjing University; May 2014; 73 pages (*English Abstract on page III and IV*).

* cited by examiner

METHOD AND SYSTEM FOR RENDERING PANORAMIC VIDEO

CROSS-REFERENCE TO RELATED APPLICATION

The present application is the U.S. National Stage of International Application No. PCT/CN2021/112332, filed on Aug. 12, 2021, which claims priority to Chinese Patent Application No. 202011339582.8, filed with the China National Intellectual Property Administration on Nov. 25, 2020, and entitled "METHOD AND SYSTEM FOR RENDERING PANORAMIC VIDEO", both of which are incorporated herein by reference in their entireties.

TECHNICAL FIELD

The present application relates to the technical field of image rendering, and in particular to a method and system for rendering a panoramic video, an electronic apparatus, and a computer-readable storage medium.

BACKGROUND ART

With the popularization and development of computer technologies, users often need to perform panoramic video rendering on electronic devices. An input method has become an important tool for users to interact with the electronic devices. Users in different professional fields and with different interests and usage habits have increasingly high requirements on the intelligence of the input method.

A panoramic video is a video shot with a 3D camera in an all-round 360-degree scene. When viewing the panoramic video, a user can adjust the video at will in directions of up, down, left, and right, which can bring a fully immersive experience to the viewer. The panoramic video is essentially a spherical video. Current mainstream coding technologies do not support processing of a three-dimensional spherical video format. Therefore, before storage and coding, it is necessary to map the panoramic video onto a two-dimensional plane, and such a mapping process is referred to as projection. At present, a WebGL (Web Graphics Library) tool is usually used for panoramic video rendering. The WebGL is intended to present interactive 2D and 3D graphics in any compatible web browser without using a plug-in.

However, the inventors have recognized that the WebGL only provides a basic 3D graphics drawing tool, without considering adaptability of a panoramic video in different presentation modes, a difference between interaction manners of different client devices, high consumption in rendering performance, and other problems.

It should be noted that the foregoing content is not intended to limit the protection scope of the present application.

SUMMARY OF THE INVENTION

A main objective of the present application is to provide a method and system for rendering a panoramic video, an electronic apparatus, and a computer-readable storage medium, so as to solve at least one of the foregoing technical problems.

To achieve the foregoing objective, an embodiment of the present application provides a method for rendering a panoramic video. The method includes:
  obtaining a current frame of image from a video source, and generating texture map data, where a viewpoint region is determined based on a field of view of a perspective camera, and image pixels outside the viewpoint region are rendered at a lower resolution than image pixels within the viewpoint region;
  constructing a spherical rendering model, and mapping the current frame of image to a three-dimensional image based on the texture map data; and
  projecting the three-dimensional image onto a two-dimensional screen.

Optionally, the determining a viewpoint region based on a field of view of a perspective camera includes:
  obtaining a field-of-view range of the perspective camera and a preset field-of-view threshold; and
  determining the viewpoint region by adding the field-of-view range and the field-of-view threshold together.

Optionally, the rendering image pixels outside the viewpoint region at a lower resolution than image pixels within the viewpoint region includes:
  setting, from preset resolution levels, a first resolution for playing the panoramic video;
  rendering the image pixels within the viewpoint region at the first resolution to generate first texture map data;
  obtaining, from the preset resolution levels, a second resolution that is one level lower than the first resolution; and
  rendering the image pixels outside the viewpoint region at the second resolution to generate second texture map data.

Optionally, the projecting the three-dimensional image onto a two-dimensional screen includes:
  monitoring an interactive operation corresponding to a predetermined interaction manner of a client;
  recording a two-dimensional offset generated by the interactive operation;
  converting the two-dimensional offset into an offset angle of the three-dimensional image in the spherical rendering model; and
  updating a projection matrix of the perspective camera based on the offset angle.

Optionally, the predetermined interaction manner of the client includes the following:
  when the client is a web-based client, the predetermined interaction manner is an interactive operation of a mouse or a keyboard; and
  when the client is a mobile client, the predetermined interaction manner is a touchscreen operation or a device field-of-view mode control operation.

Optionally, the projecting the three-dimensional image onto a two-dimensional screen further includes:
  monitoring whether a size of a presentation region for playing the panoramic video has changed;
  when the size of the presentation region has changed, obtaining a changed size of the presentation region; and
  adjusting a size of a rendering canvas based on the changed size, and updating a projection matrix of the perspective camera.

Optionally, the adjusting a size of a rendering canvas includes:
  setting the rendering canvas to the same size as the changed size of the presentation region.

Optionally, after the obtaining a current frame of image from a video source, the method further includes:
  determining, based on a preset performance detection parameter, whether the current frame of image needs to be rendered; and when the current frame of image does not need to be rendered, skipping the current frame of image, and continuing to obtain a next frame of image.

In addition, to achieve the foregoing objective, an embodiment of the present application further proposes a system for rendering a panoramic video, the system including:

a rendering module configured to obtain a current frame of image from a video source, and generate texture map data, where a viewpoint region is determined based on a field of view of a perspective camera, and image pixels outside the viewpoint region are rendered at a lower resolution than image pixels within the viewpoint region;

a mapping module configured to construct a spherical rendering model, and map the current frame of image to a three-dimensional image based on the texture map data; and a projection module configured to project the three-dimensional image onto a two-dimensional screen.

To achieve the foregoing objective, an embodiment of the present application further proposes an electronic apparatus, the electronic apparatus including: a memory, a processor, and computer-readable instructions stored on the memory and executable on the processor, where when the computer-readable instructions are executed by the processor, the following steps are implemented:

obtaining a current frame of image from a video source, and generating texture map data, where a viewpoint region is determined based on a field of view of a perspective camera, and image pixels outside the viewpoint region are rendered at a lower resolution than image pixels within the viewpoint region;

constructing a spherical rendering model, and mapping the current frame of image to a three-dimensional image based on the texture map data; and projecting the three-dimensional image onto a two-dimensional screen.

To achieve the foregoing objective, an embodiment of the present application further provides a computer-readable storage medium having computer-readable instructions stored thereon, where when the computer-readable instructions are executed by a processor, the following steps are implemented:

obtaining a current frame of image from a video source, and generating texture map data, where a viewpoint region is determined based on a field of view of a perspective camera, and image pixels outside the viewpoint region are rendered at a lower resolution than image pixels within the viewpoint region;

constructing a spherical rendering model, and mapping the current frame of image to a three-dimensional image based on the texture map data; and projecting the three-dimensional image onto a two-dimensional screen.

According to the method and system for rendering a panoramic video, the electronic apparatus, and the computer-readable storage medium proposed in the embodiments of the present application, image pixels outside a viewpoint region of a user are rendered at a lower resolution, thereby optimizing rendering efficiency and avoiding playback freezing.

DETAILED DESCRIPTION OF EMBODIMENTS

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Therefore, a feature defined by "first" or "second" may explicitly or implicitly includes at least one feature. Additionally, technical solutions in various embodiments may be combined with each other, provided that they can be implemented by persons of ordinary skill in the art. When a combination of the technical solutions incurs conflict or cannot be implemented, it should be considered that such a combination of the technical solutions does not exist, and does not fall within the claimed scope of protection of the present application either.

Figure 1:
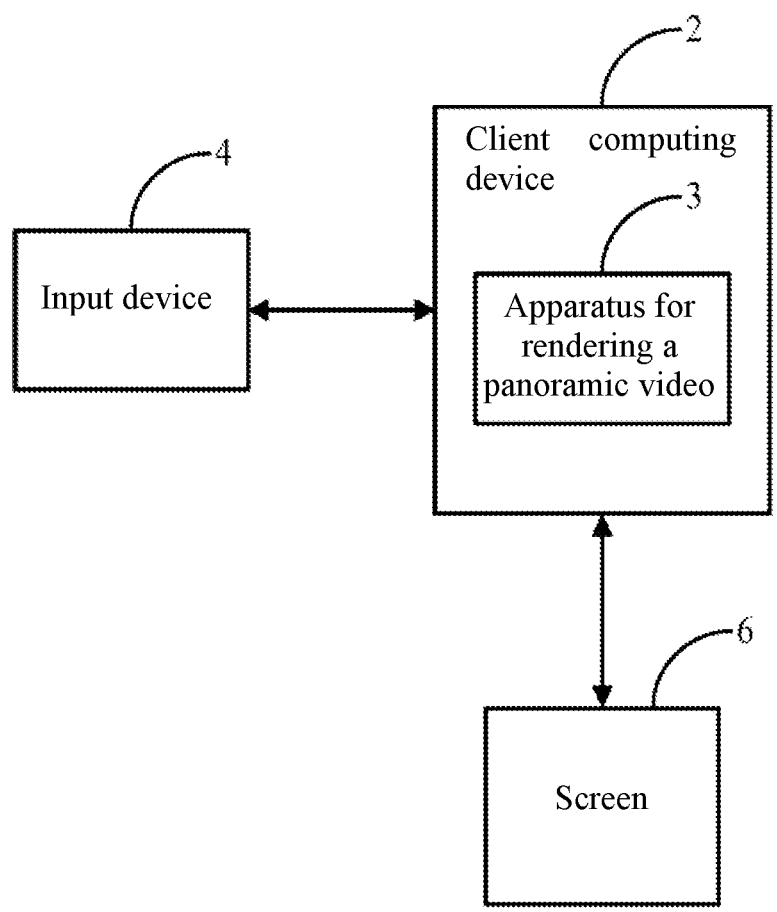
FIG. 1 is an architecture diagram of an application environment for implementing various embodiments of the present application.

Referring to FIG. 1, FIG. 1 is an architecture diagram of an application environment for implementing various embodiments of the present application. The present application can be applied to an application environment that includes, but is not limited to, a client computing device 2, an input device 4, and a screen 6.

The client computing device 2 includes an apparatus 3 for rendering a panoramic video. The apparatus is configured to: obtain a current frame of image of the panoramic video from a video source, and generate texture map data; map the current frame of image to a three-dimensional image based on a spherical rendering model and the texture map data; and determine a field of view based on an interaction event of a user to build a three-dimensional rendering scene, and project the rendered three-dimensional image onto the two-dimensional screen 6. The client computing device 2 may be a web-based client device, e.g., a personal computer (PC), or may be a mobile client device, e.g., a mobile phone, a tablet computer, or a wearable device.

The input device 4 is configured to input an interactive operation to control a direction of viewing the panoramic video and change the field of view. When the client device 2 is a web-based client device, the input device 4 may be a mouse, a keyboard, or the like. When the client device 2 is a mobile client device, the input device may be a touchscreen or the like.

The screen 6 is configured to receive the rendered three-dimensional image projected by the client device 2, and play the image for the user to view.

The input device 4 and the screen 6 may be peripheral devices of the client device 2, or may be within the client device 2.

Embodiment 1

Figure 2:
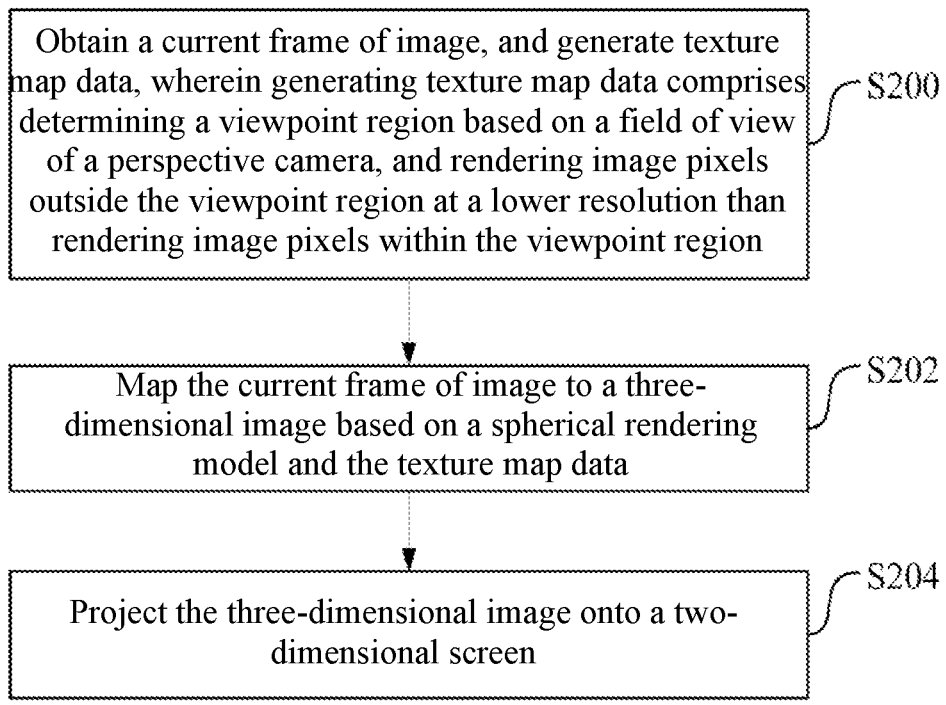
FIG. 2 is a flowchart of a method for rendering a panoramic video according to a first embodiment of the present application.

FIG. 2 is a flowchart of a method for rendering a panoramic video according to a first embodiment of the present application. It may be understood that the flowchart in this method embodiment is not intended to limit an execution sequence of the steps. As required, addition or deletion may also be made to some steps in the flowchart.

The method includes the following steps.

S200: Obtain a current frame of image from a video source, and generate texture map data corresponding to the current frame of image, wherein the generating texture map data comprises determining a viewpoint region based on a field of view of a perspective camera, and rendering image pixels outside the viewpoint region at a lower resolution than rendering image pixels within the viewpoint region.

When the panoramic video is to be played on a client, each frame of image needs to be first obtained from the video source, and the texture map data needs to be generated by drawing based on the frame of image. Rendering and redrawing of a texture map are triggered when each frame of image of the panoramic video is updated.

The perspective camera is constructed as a point for a user to view the panoramic video, and placed at the center of a three-dimensional sphere of a spherical rendering model. Because a field-of-view range presented by the perspective camera is limited, the user can view only a scene within the field-of-view range. A viewpoint region of the user can be determined based on the field-of-view (FOV) range of the perspective camera and a size of a rendering canvas. In this embodiment, a field-of-view threshold (Offset) needs to be further preset, and the field-of-view threshold and the field-of-view range are added together as the finally determined viewpoint region, so that a range of the viewpoint region is appropriately expanded. Then, the image pixels outside the viewpoint region are rendered by using a low-resolution shader to generate low-precision texture map data, while rendering precision of the image pixels within the viewpoint region keeps consistent with a resolution of the original video image.

Figure 3:
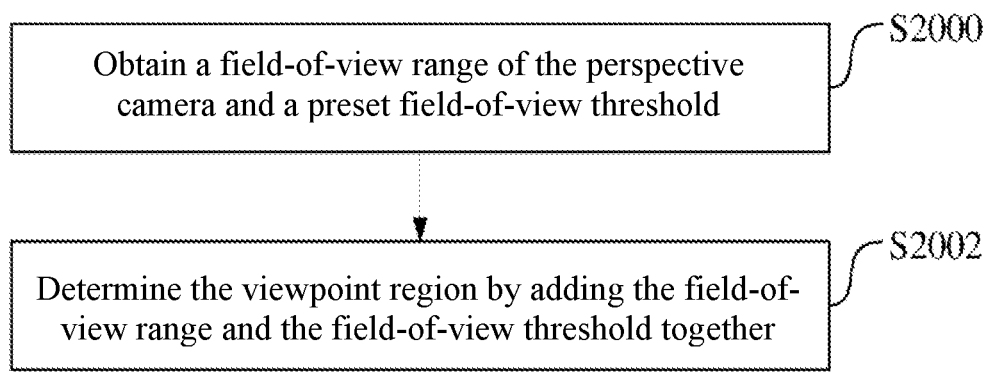
FIG. 3 is a detailed schematic flowchart of step S200 in FIG. 2.

For details, refer further to FIG. 3, which is a detailed schematic flowchart of step S200 of determining a viewpoint region based on a field of view of a perspective camera. In this embodiment, the determining a viewpoint region based on a field of view of a perspective camera specifically includes the following steps.

S2000: Obtain a field-of-view range of the perspective camera and a preset field-of-view threshold.

The field-of-view threshold may be flexibly set based on a size of a remaining region of the rendering canvas outside the field-of-view range, a viewing habit of the user, etc., to appropriately expand the field-of-view range.

S2002: Determine the viewpoint region by adding the field-of-view range and the field-of-view threshold together.

For example, the field-of-view threshold is added around a region in which the field-of-view range is located, to obtain an enlarged region, which is the viewpoint region.

Figure 4:
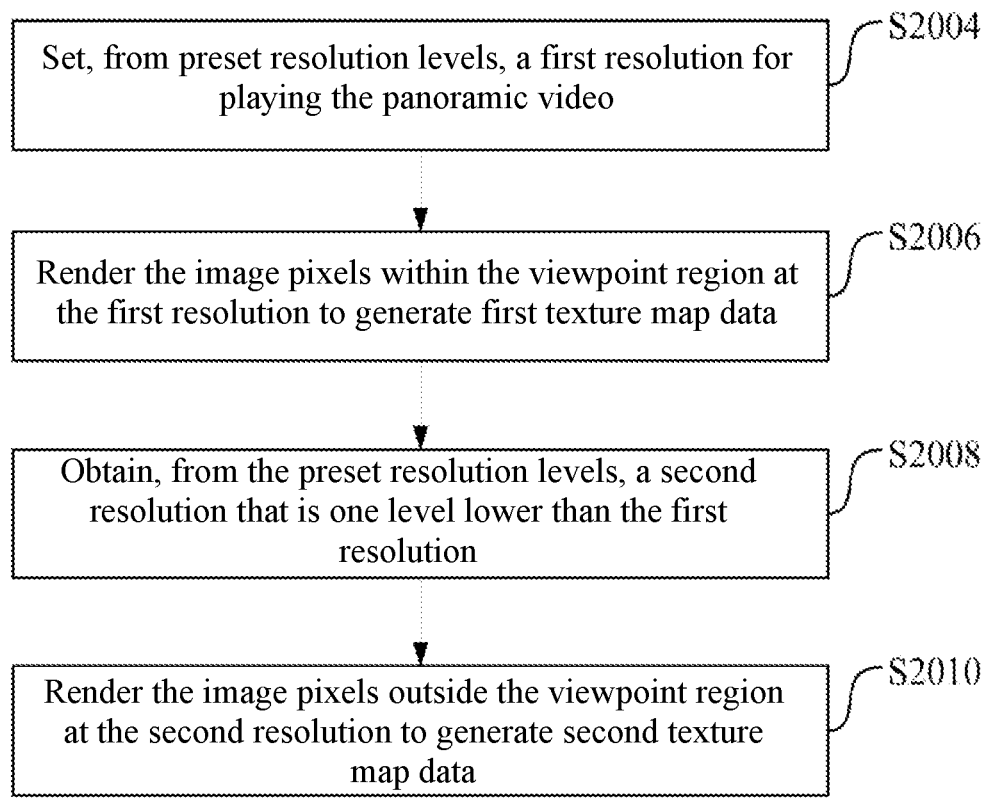
FIG. 4 is another detailed schematic flowchart of step S200 in FIG. 2.

Refer further to FIG. 4, which is a detailed schematic flowchart of step S200 of rendering image pixels outside the viewpoint region at a lower resolution than image pixels within the viewpoint region. In this embodiment, the rendering image pixels outside the viewpoint region at a lower resolution than image pixels within the viewpoint region specifically includes the following steps.

S2004: Set, from preset resolution levels, a first resolution for playing the panoramic video.

Generally, playback of the panoramic video corresponds to a resolution level, such as ultra-high-definition or high-definition. First, the first resolution for playing the panoramic video is set from the preset resolution levels. The setting may be a setting based on a selection of the user, or may be a default setting, or may be an original setting used for shooting the panoramic video, or the like.

S2006: Render the image pixels within the viewpoint region at the first resolution to generate first texture map data.

For example, when the first resolution is a resolution corresponding to an ultra-high-definition video, the image pixels within the viewpoint region are rendered by using a shader of the resolution, to generate the corresponding first texture map data with relatively high precision.

S2008: Obtain, from the preset resolution levels, a second resolution that is one level lower than the first resolution.

For example, when the first resolution is the resolution corresponding to the ultra-high-definition video, the second resolution may be a resolution corresponding to a high-definition video.

S2010: Render the image pixels outside the viewpoint region at the second resolution to generate second texture map data.

For example, the image pixels outside the viewpoint region are rendered by using a shader of the resolution corresponding to the high-definition video, to generate the corresponding second texture map data with relatively low precision.

The image pixels outside the viewpoint region are rendered at a lower resolution, so that computing pressure on a CPU (central processing unit) and a GPU (graphics processing unit) can be reduced. Moreover, the higher the resolution of the video, the more the performance is improved when the pixels outside the viewpoint region are rendered at a lower resolution by using this method.

Referring back to FIG. 2, S202 is mapping the current frame of image to a three-dimensional image based on a spherical rendering model and the texture map data.

The panoramic video is a video image that is centered on the human eye and is seamlessly connected around 180° up and down and 360° horizontally. The panoramic video is essentially a spherical video, and a spherical rendering model is constructed for rendering the panoramic video. Based on the texture map data and a conversion relationship between planar coordinates and spherical coordinates, the obtained current frame of image is mapped to a three-dimensional sphere of the spherical rendering model to obtain a three-dimensional image.

S204: Project the three-dimensional image onto a two-dimensional screen.

Projection transformation is required during the process of displaying the panoramic video in a planar display. Due to the visual effect of a perspective foreshortening display of the human eye, the perspective camera is constructed as the point for the user to view the panoramic video, and placed at the center of the three-dimensional sphere of the spherical rendering model, to implement the process of projecting the three-dimensional image onto the two-dimensional screen.

During the projection process, the field of view also needs to be updated based on an interaction event of the client, to build a corresponding three-dimensional rendering scene. The field of view for the panoramic video is updated by monitoring interactive operations of different clients. When the basic function of playing the panoramic video is satisfied, it is determined, through analysis of the uniqueness of interaction manners of various clients, that a web-based client uses two peripheral interaction behaviors, namely, a mouse and a keyboard, to switch the field of view for the panoramic video; and the mobile client controls the field of view through a touchscreen operation and a field-of-view mode operation of the mobile device.

Figure 5:
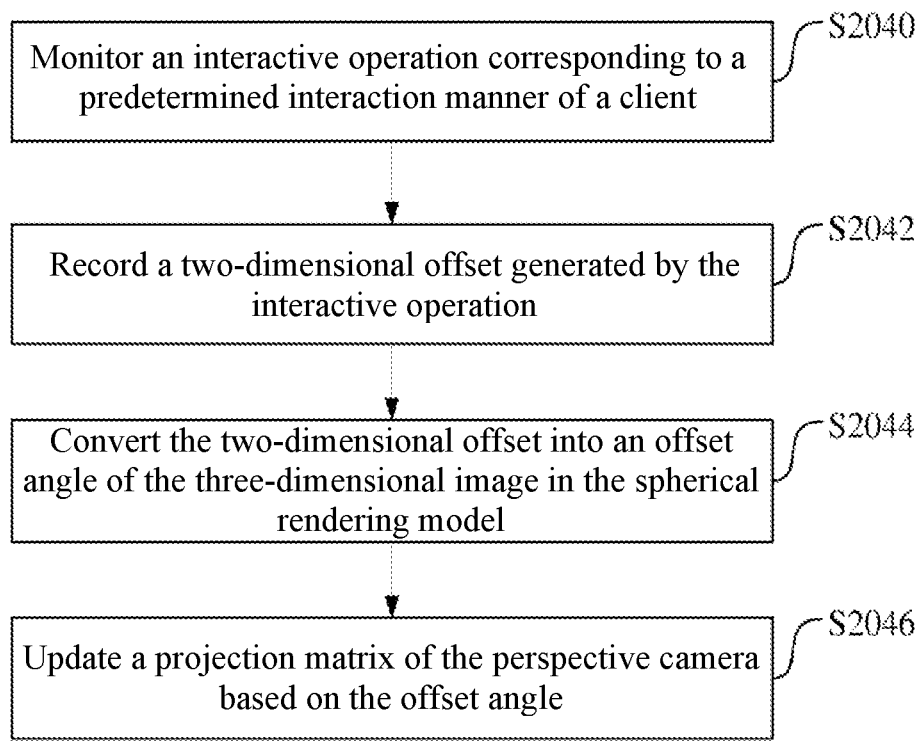
FIG. 5 is a detailed schematic flowchart of step S204 in FIG. 2.

For details, refer further to FIG. 5, which is a detailed schematic flowchart of S204. In this embodiment, step S204 may include the following steps.

S2040: Monitor an interactive operation corresponding to a predetermined interaction manner associated with a client computing device.

When the client computing device is a web-based client, the predetermined interaction manner comprises an interactive operation performed via a mouse or a keyboard; and when the client is a mobile client, the predetermined interaction manner comprises an operation performed via a touchscreen or an operation performed via a device of controlling field-of-view mode.

S2042: Record a two-dimensional offset generated by the interactive operation.

After the interactive operation corresponding to the predetermined interaction manner is detected, the two-dimensional offset generated by the interactive operation of the user, e.g., a two-dimensional offset generated by the user moving the mouse or a two-dimensional offset generated by the user moving a finger on the touchscreen, is recorded.

S2044: Convert the two-dimensional offset into an offset angle of the three-dimensional image in the spherical rendering model.

According to an existing conversion calculation formula, the two-dimensional offset can be converted into the offset angle of the three-dimensional image in the spherical rendering model. A specific conversion method is not described in detail herein.

S2046: Update a projection matrix of the perspective camera based on the offset angle.

Based on a three-dimensional rotation coordinate system of the perspective camera, the projection matrix of the perspective camera is updated based on the offset angle, so that the direction of viewing the panoramic video can be changed, thereby updating a projected image within a visible region.

In addition, a range of the visible region of the two-dimensional projection varies depending on client devices or sizes of players. Therefore, it is necessary to monitor and determine a change in a size of a presentation region of playing the panoramic video, to adjust the size of the rendering canvas and update the projection matrix of the perspective camera, thereby implementing adaptive presentation of the image.

Figure 6:
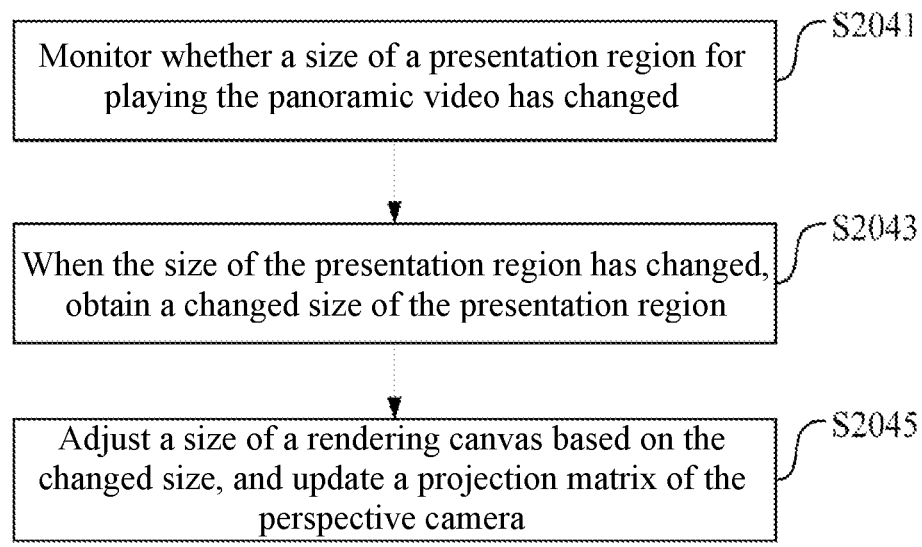
FIG. 6 is another detailed schematic flowchart of step S204 in FIG. 2.

For details, refer further to FIG. 6, which is another detailed schematic flowchart of S204. In this embodiment, step S204 may further include the following steps.

S2041: Monitor whether a size of a presentation region for playing the panoramic video has changed.

Whether the size of the presentation region has changed may be monitored by setting a corresponding monitoring event.

S2043: When the size of the presentation region has changed, obtain a changed size of the presentation region.

To be specific, the changed width and height values of the presentation region are obtained.

S2045: Adjust a size of a rendering canvas based on the changed size, and update a projection matrix of the perspective camera.

In this embodiment, the adjusting a size of a rendering canvas refers to setting the rendering canvas to the same size as the changed size of the presentation region. Then, the projection matrix of the perspective camera is updated based on the adjusted size of the rendering canvas. The projection matrix may be updated by using an existing algorithm, which is not described in detail herein.

According to the method for rendering a panoramic video proposed in this embodiment, specific user interaction manners can be used depending on interaction characteristics of different devices, so that the user can view the video from any field of view. The size of the rendering canvas can also be dynamically adjusted based on widths and heights of the video presentation region in different client devices or presentation modes, thereby implementing adaptive presentation of the image. In addition, image pixels outside a viewpoint region of a user are rendered at a lower resolution, thereby optimizing rendering efficiency and avoiding playback freezing.

Embodiment 2

Figure 7:
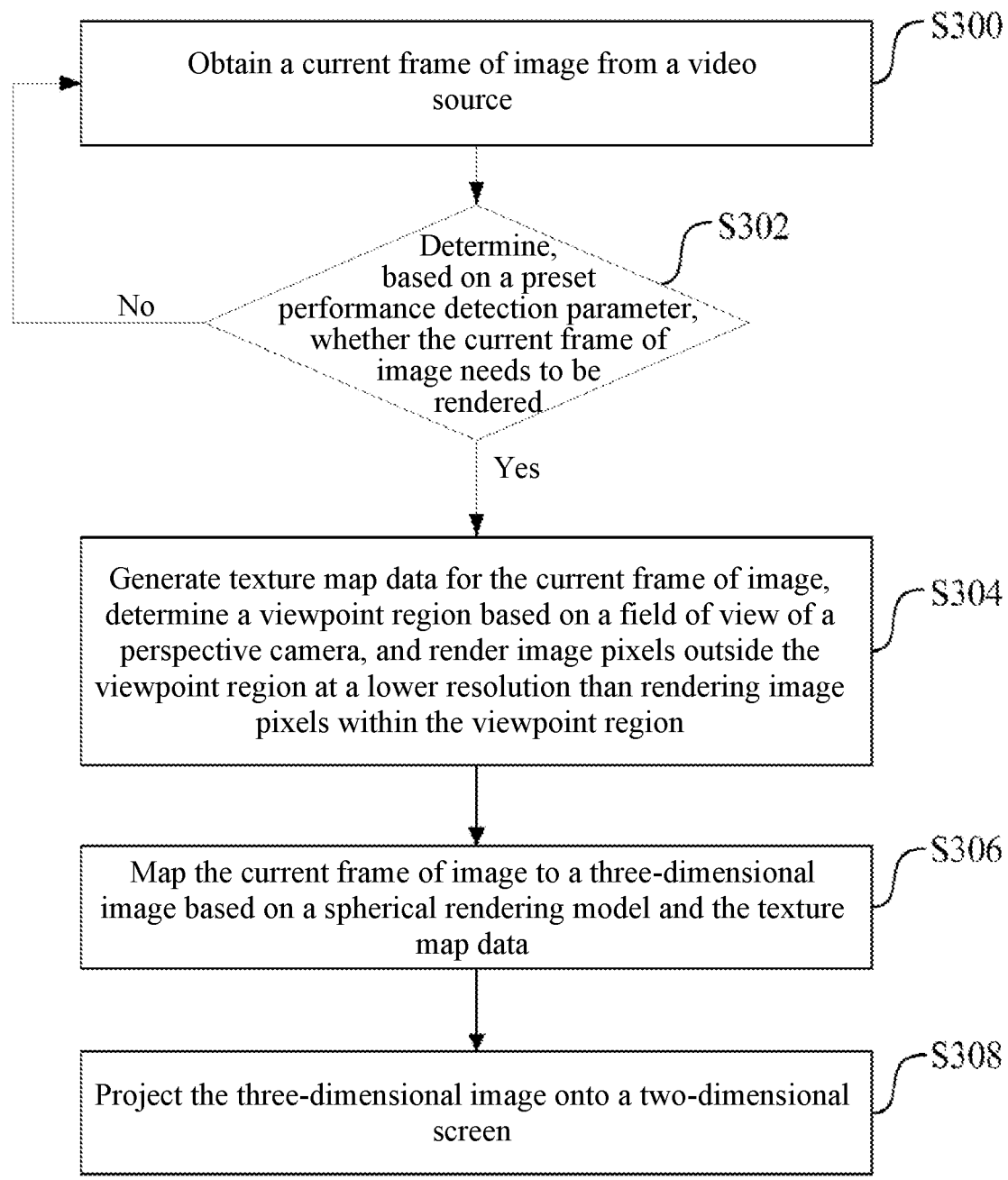
FIG. 7 is a flowchart of a method for rendering a panoramic video according to a second embodiment of the present application.

FIG. 7 is a flowchart of a method for rendering a panoramic video according to a second embodiment of the present application. In the second embodiment, the method for rendering a panoramic video further includes step S302 on the basis of the foregoing first embodiment. It may be understood that the flowchart in this method embodiment is not intended to limit an execution sequence of the steps. As required, addition or deletion may also be made to some steps in the flowchart.

The method includes the following steps.

S300: Obtain a current frame of image from a video source.

When the panoramic video is to be played on a client, each frame of image needs to be first obtained from the video source, and the texture map data needs to be generated by drawing based on the frame of image.

S302: Determine, based on a preset performance detection parameter, whether the current frame of image needs to be rendered. When the current frame of image does not need to be rendered, return to step S300, that is, skip the current frame of image, and continue to obtain a next frame of image.

Rendering and redrawing of a texture map are triggered, and a large number of hardware resources such as a CPU and a GPU are called when each frame of image of the panoramic video is updated. Therefore, to improve the rendering performance, on the premise that the basic rendering effect is maintained, the number of redrawings and renderings per second is minimized based on preset performance detection parameter such as an FPS (frames per second)

during an actual rendering, a freezing rate, and a GPU usage, to control a rendering frame rate and reduce computing pressure on the device, thereby avoiding playback freezing.

After the current frame of image is obtained, whether the current frame of image needs to be rendered is determined based on one or more of the foregoing performance detection parameters. For example, based on the foregoing performance detection parameter during the actual rendering, it is calculated that not all frames of images need to be rendered, and rendering may be performed only for key frames, and then it is determined whether the current frame of image is a key frame. If the current frame of image is a key frame, rendering is required, and a next step continues to be performed. If the current frame of image is not a key frame, skip the current frame of image, and return to the previous step to continue obtaining a next current frame of image.

S304: Generate texture map data for the current frame of image, where a viewpoint region is determined based on a field of view of a perspective camera, and image pixels outside the viewpoint region are rendered at a lower resolution than image pixels within the viewpoint region.

A viewpoint region of a user can be determined based on a field-of-view range of the perspective camera and a size of a rendering canvas. In this embodiment, a field-of-view threshold needs to be further preset, and the field-of-view threshold and the field-of-view range are added together as the finally determined viewpoint region, so that a range of the viewpoint region is appropriately expanded. Then, the image pixels outside the viewpoint region are rendered by using a low-resolution shader to generate low-precision texture map data, while rendering precision of the image pixels within the viewpoint region keeps consistent with the original resolution.

The image pixels outside the viewpoint region are rendered at a lower resolution, so that computing pressure on a CPU and a GPU can be reduced. Moreover, the higher the resolution of the video, the more the performance is improved when the pixels outside the viewpoint region are rendered at a lower resolution by using this method.

For a specific process of this step, refer to step S200 and the related descriptions of FIG. 3 and FIG. 4, and details are not repeated here.

S306: Construct a spherical rendering model, and map the current frame of image to a three-dimensional image based on the texture map data.

The panoramic video is a video image that is centered on the human eye and is seamlessly connected around 180° up and down and 360° horizontally. The panoramic video is essentially a spherical video, and therefore a spherical rendering model needs to be constructed. Based on the texture map data and a conversion relationship between planar coordinates and spherical coordinates, the obtained current frame of image is mapped to a three-dimensional sphere to obtain a three-dimensional image.

S308: Project the three-dimensional image onto a two-dimensional screen.

Projection transformation is required during the process of displaying the panoramic video in the planar display. Due to the visual effect of a perspective foreshortening display of the human eye, the perspective camera is constructed as the point for the user to view the panoramic video, and placed at the center of the three-dimensional sphere of the spherical rendering model, to implement the process of projecting the three-dimensional image onto the two-dimensional screen.

During the projection process, the field of view also needs to be switched based on an interaction event of the client, to build a corresponding three-dimensional rendering scene. The field of view for the panoramic video is switched by monitoring interactive operations of different clients. When the basic function of playing the panoramic video is satisfied, it is determined, through analysis of the uniqueness of interaction manners of various clients, that a web-based client uses two peripheral interaction behaviors, namely, a mouse and a keyboard, to switch the field of view for the panoramic video; and the mobile client controls the field of view through a touchscreen operation and a field-of-view mode operation of the mobile device.

In addition, a range of the visible region of the two-dimensional projection varies depending on client devices or sizes of players. Therefore, it is necessary to monitor and determine a change in a size of a presentation region of the panoramic video, to adjust the size of the rendering canvas and update the projection matrix of the perspective camera, thereby implementing adaptive presentation of the image.

For a specific process of this step, refer to step S204 and the related descriptions of FIG. 5 and FIG. 6, and details are not repeated here.

According to the method for rendering a panoramic video proposed in this embodiment, specific user interaction manners can be used depending on interaction characteristics of different devices, so that the user can view the video from any field of view. The size of the rendering canvas can also be dynamically adjusted based on widths and heights of the video presentation region in different client devices or presentation modes, thereby implementing adaptive presentation of the image. In addition, real-time rendering performance of the panoramic video is directly related to the viewing experience of the user. Therefore, based on the principle of 3D graphics drawing, rendering consumption is analyzed and code is optimized. The image pixels outside the viewpoint region of the user are rendered at a lower resolution, and the rendering frame rate is adjusted based on the rendering performance, so that rendering efficiency can be improved to provide a better user experience.

Embodiment 3

Figure 8:
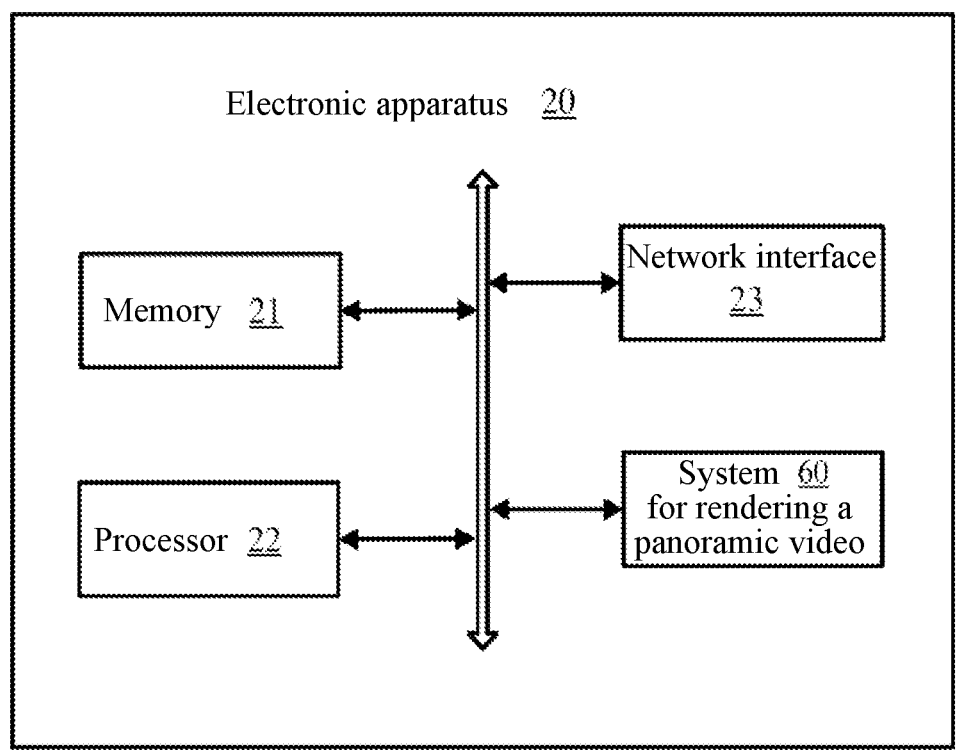
FIG. 8 is a schematic diagram of a hardware architecture of an electronic apparatus according to a third embodiment of the present application.

FIG. 8 is a schematic diagram of a hardware architecture of an electronic apparatus according to a third embodiment of the present application. In this embodiment, the electronic apparatus 20 may include, but is not limited to, a memory 21, a processor 22, and a network interface 23 that can be communicatively connected to each other via a system bus. It should be noted that FIG. 8 shows only the electronic apparatus 20 having the components 21 to 23, but it should be understood that not all of the illustrated components are required to be implemented, and more or fewer components may be implemented instead. In this embodiment, the electronic apparatus 20 may be the client device 2 or the apparatus 3 for rendering a panoramic video.

The memory 21 includes at least one type of readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 21 may be an internal storage unit of the electronic apparatus 20, such as a hard disk or an internal memory of the electronic apparatus 20. In some other embodiments, the memory 21 may alternatively be an external storage device of the electronic apparatus 20, for example, a plug-in type hard disk equipped on the electronic apparatus 20, a smart media card (SMC), a secure digital (SD) card, or a flash card. Certainly, the memory 21 may alternatively include both the internal storage unit of the electronic apparatus 20 and the external storage device thereof. In this embodiment, the memory 21 is generally configured to store an operating system and various types of application software installed on the electronic apparatus 20, such as computer-readable instructions of a system 60 for rendering a panoramic video. In addition, the memory 21 may be further configured to temporarily store various types of data that has been output or will be output.

The processor 22 may be, in some embodiments, a central processing unit (CPU), a controller, a microcontroller, a microprocessor, or other data processing chips. The processor 22 is generally configured to control overall operations of the electronic apparatus 20. In this embodiment, the processor 22 is configured to run the computer-readable instructions stored in the memory 21 or process data, for example, to run the system 60 for rendering a panoramic video.

The network interface 23 may include a wireless network interface or a wired network interface, and the network interface 23 is typically configured to establish a communication connection between the electronic apparatus 20 and another electronic device.

Embodiment 4

Figure 9:
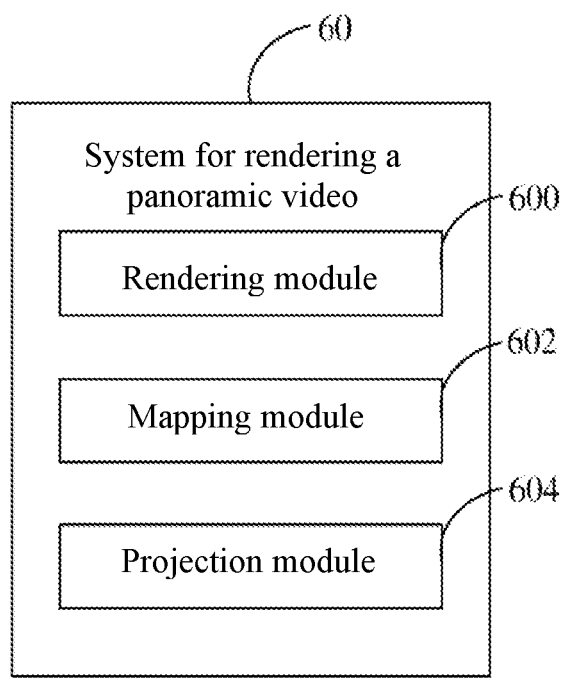
FIG. 9 is a schematic modular diagram of a system for rendering a panoramic video according to a fourth embodiment of the present application.

FIG. 9 is a schematic modular diagram of a system 60 for rendering a panoramic video according to a fourth embodiment of the present application. The system 60 for rendering a panoramic video may be divided into one or more program modules, and the one or more program modules are stored in a storage medium and executed by one or more processors to implement the embodiments of the present application. The program modules mentioned in this embodiment of the present application refer to a series of computer-readable instruction segments that can complete specific functions. Functions of various program modules in this embodiment will be specifically described below.

In this embodiment, the system 60 for rendering a panoramic video includes a rendering module 600, a mapping module 602, and a projection module 604.

The rendering module 600 is configured to obtain a current frame of image from a video source, and generate texture map data, where a viewpoint region is determined based on a field of view of a perspective camera, and image pixels outside the viewpoint region are rendered at a lower resolution than image pixels within the viewpoint region.

A viewpoint region of a user can be determined based on a field-of-view range of the perspective camera and a size of a rendering canvas. In this embodiment, a field-of-view threshold needs to be further preset, and the field-of-view threshold and the field-of-view range are added together as the finally determined viewpoint region, so that a range of the viewpoint region is appropriately expanded. Then, the image pixels outside the viewpoint region are rendered by using a low-resolution shader to generate low-precision texture map data, while rendering precision of the image pixels within the viewpoint region keeps consistent with the original resolution.

The image pixels outside the viewpoint region are rendered at a lower resolution, so that computing pressure on a CPU and a GPU can be reduced. Moreover, the higher the resolution of the video, the more the performance is improved when the pixels outside the viewpoint region are rendered at a lower resolution by using this method.

The mapping module 602 is configured to construct a spherical rendering model, and map the current frame of image to a three-dimensional image based on the texture map data.

The panoramic video is a video image that is centered on the human eye and is seamlessly connected around 180° up and down and 360° horizontally. The panoramic video is essentially a spherical video, and therefore a spherical rendering model needs to be constructed. Based on the texture map data and a conversion relationship between planar coordinates and spherical coordinates, the obtained current frame of image is mapped to a three-dimensional sphere to obtain a three-dimensional image.

The projection module 604 is configured to project the three-dimensional image onto a two-dimensional screen.

Projection transformation is required during the process of displaying the panoramic video in the planar display. Due to the visual effect of a perspective foreshortening display of the human eye, the perspective camera is constructed as the point for the user to view the panoramic video, and placed at the center of the three-dimensional sphere of the spherical rendering model, to implement the process of projecting the three-dimensional image onto the two-dimensional screen.

During the projection process, the field of view also needs to be switched based on an interaction event of the client, to build a corresponding three-dimensional rendering scene. The field of view for the panoramic video is switched by monitoring interactive operations of different clients. When the basic function of playing the panoramic video is satisfied, it is determined, through analysis of the uniqueness of interaction manners of various clients, that a web-based client uses two peripheral interaction behaviors, namely, a mouse and a keyboard, to switch the field of view for the panoramic video; and the mobile client controls the field of view through a touchscreen operation and a field-of-view mode operation of the mobile device.

In addition, a range of the visible region of the two-dimensional projection varies depending on client devices or sizes of players. Therefore, it is necessary to monitor and determine a change in a size of a presentation region of the panoramic video, to adjust the size of the rendering canvas and update the projection matrix of the perspective camera, thereby implementing adaptive presentation of the image.

According to the system for rendering a panoramic video proposed in this embodiment, specific user interaction manners can be used depending on interaction characteristics of different devices, so that the user can view the video from any field of view. The size of the rendering canvas can also be dynamically adjusted based on widths and heights of the video presentation region in different client devices or presentation modes, thereby implementing adaptive presentation of the image. In addition, image pixels outside a viewpoint region of a user are rendered at a lower resolution, thereby optimizing rendering efficiency and avoiding playback freezing.

Embodiment 5

The present application further provides another implementation, that is, provides a computer-readable storage medium storing computer-readable instructions that may be executed by at least one processor to cause the at least one processor to perform the following steps:

obtaining a current frame of image from a video source, and generating texture map data, where a viewpoint region is determined based on a field of view of a perspective camera, and image pixels outside the viewpoint region are rendered at a lower resolution than image pixels within the viewpoint region;

constructing a spherical rendering model, and mapping the current frame of image to a three-dimensional image based on the texture map data;

projecting the three-dimensional image onto a two-dimensional screen.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element.

The serial numbers of the foregoing embodiments of the present application are merely for description, and do not represent the superiority or inferiority of the embodiments.

It will be apparent to those skilled in the art that the various modules or steps in the embodiments of the present application can be implemented by a general-purpose computing apparatus that can be centralized on a single computing apparatus or distributed across a network formed by a plurality of computing apparatuses. Optionally, they may be implemented by computer-readable instructions executable by the computing apparatus, such that they may be stored in a storage apparatus and executed by the computing apparatus, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely illustrative of preferred embodiments of the embodiments of the present application, and are not intended to limit the patent scope of the embodiments of the present application. Any equivalent structure or equivalent process transformation made using the contents of the description and accompanying drawings of the embodiments of the present application, or any direct or indirect application thereof in other related technical fields shall equally fall within the patent protection scope of the embodiments of the present application.

What is claimed is:

1. A method for rendering a panoramic video, the method comprising:

obtaining a current frame of image from a video source;

generating texture map data corresponding to the current frame of image, wherein the generating texture map data comprises determining a viewpoint region based on a field of view of a perspective camera, and rendering image pixels outside the viewpoint region at a lower resolution than rendering image pixels within the viewpoint region, and wherein the perspective camera is constructed at a center of a three-dimensional sphere of a spherical rendering model as a point for a user to view the panoramic video;

mapping the current frame of image to a three-dimensional image based on the spherical rendering model and the texture map data; and projecting the three-dimensional image onto a two-dimensional screen, wherein the projecting the three-dimensional image onto a two-dimensional screen further comprises:

monitoring whether a size of a presentation region for playing the panoramic video has changed, in determining that the size of the presentation region has changed, obtaining a changed size of the presentation region, and adjusting a size of a rendering canvas and updating a projection matrix of the perspective camera based on the changed size.

2. The method according to claim 1, wherein the determining a viewpoint region based on a field of view of a perspective camera comprises:

obtaining a field-of-view range of the perspective camera and a preset field-of-view threshold; and determining the viewpoint region by adding a region indicated by the preset field-of-view threshold surrounding a region indicated by the field-of-view range.

3. The method according to claim 1, wherein the rendering image pixels outside the viewpoint region at a lower resolution than rendering image pixels within the viewpoint region comprises:

setting a first resolution in preset resolution levels for playing the panoramic video;

rendering the image pixels within the viewpoint region at the first resolution to generate first texture map data;

determining a second resolution in the preset resolution levels, wherein the second resolution is one level lower than the first resolution; and rendering the image pixels outside the viewpoint region at the second resolution to generate second texture map data.

4. The method according to claim 1, wherein the projecting the three-dimensional image onto a two-dimensional screen comprises:

monitoring an interactive operation corresponding to a predetermined interaction manner associated with a client computing device;

recording a two-dimensional offset generated by the interactive operation;

converting the two-dimensional offset into an offset angle of the three-dimensional image in the spherical rendering model; and updating a projection matrix of the perspective camera based on the offset angle.

5. The method according to claim 4, wherein the predetermined interaction manner associated with a client computing device comprises:

when the client computing device is a web-based computing device, the predetermined interaction manner comprises an interactive operation performed via a mouse or a keyboard; and when the client computing device is a mobile computing device, the predetermined interaction manner comprises an operation performed via a touchscreen or an operation performed via a device of controlling field-of-view mode.

6. The method according to claim 1, wherein the adjusting a size of a rendering canvas comprises:

setting the rendering canvas to a same size as the changed size of the presentation region.

7. The method according to claim 1, wherein after the obtaining a current frame of image from a video source, the method further comprises:

determining whether the current frame of image needs to be rendered based on a preset performance detection parameter; and in response to determining that the current frame of image does not need to be rendered, skipping the current frame of image and continuing to obtain a next frame of image.

8. An electronic device, comprising: a memory, a processor, and computer-readable instructions stored on the memory and executable on the processor, wherein when the computer-readable instructions are executed by the processor, the processor implements operations comprising:

obtaining a current frame of image from a video source;

generating texture map data corresponding to the current frame of image, wherein the generating texture map data comprises determining a viewpoint region based on a field of view of a perspective camera, and rendering image pixels outside the viewpoint region at a lower resolution than rendering image pixels within the viewpoint region, and wherein the perspective camera is constructed at a center of a three-dimensional sphere of a spherical rendering model as a point for a user to view a panoramic video;

mapping the current frame of image to a three-dimensional image based on the spherical rendering model and the texture map data; and projecting the three-dimensional image onto a two-dimensional screen, wherein the projecting the three-dimensional image onto a two-dimensional screen further comprises:

monitoring whether a size of a presentation region for playing the panoramic video has changed, in determining that the size of the presentation region has changed, obtaining a changed size of the presentation region, and adjusting a size of a rendering canvas and updating a projection matrix of the perspective camera based on the changed size.

9. The electronic device according to claim 8, wherein the determining a viewpoint region based on a field of view of a perspective camera comprises:

obtaining a field-of-view range of the perspective camera and a preset field-of-view threshold; and determining the viewpoint region by adding a region indicated by the preset field-of-view threshold surrounding a region indicated by the field-of-view range.

10. The electronic device according to claim 8, wherein the rendering image pixels outside the viewpoint region at a lower resolution than rendering image pixels within the viewpoint region comprises:

setting a first resolution in preset resolution levels for playing the panoramic video;

rendering the image pixels within the viewpoint region at the first resolution to generate first texture map data;

determining a second resolution in the preset resolution levels, wherein the second resolution is one level lower than the first resolution; and rendering the image pixels outside the viewpoint region at the second resolution to generate second texture map data.

11. The electronic device according to claim 8, wherein the projecting the three-dimensional image onto a two-dimensional screen comprises:

monitoring an interactive operation corresponding to a predetermined interaction manner associated with a client computing device;

recording a two-dimensional offset generated by the interactive operation;

converting the two-dimensional offset into an offset angle of the three-dimensional image in the spherical rendering model; and updating a projection matrix of the perspective camera based on the offset angle.

12. The electronic device according to claim 11, wherein the predetermined interaction manner associated with a client computing device comprises:

when the client computing device is a web-based computing device, the predetermined interaction manner comprises an interactive operation performed via a mouse or a keyboard; and when the client computing device is a mobile computing device, the predetermined interaction manner comprises an operation performed via a touchscreen or an operation performed via a device of controlling field-of-view mode.

13. The electronic device according to claim 8, wherein the adjusting a size of a rendering canvas comprises:

setting the rendering canvas to a same size as the changed size of the presentation region.

14. The electronic device according to claim 8, wherein after the obtaining a current frame of image from a video source, the operations further comprise:

determining whether the current frame of image needs to be rendered based on a preset performance detection parameter; and in response to determining that the current frame of image does not need to be rendered, skipping the current frame of image and continuing to obtain a next frame of image.

15. A non-transitory computer-readable storage medium, having computer-readable instructions stored thereon, wherein when the computer-readable instructions are executed by a processor, the processor implements operations comprising:

obtaining a current frame of image from a video source;

generating texture map data corresponding to the current frame of image, wherein the generating texture map data comprises determining a viewpoint region based on a field of view of a perspective camera, and rendering image pixels outside the viewpoint region at a lower resolution than rendering image pixels within the viewpoint region, and wherein the perspective camera is constructed at a center of a three-dimensional sphere of a spherical rendering model as a point for a user to view the panoramic video;

mapping the current frame of image to a three-dimensional image based on the spherical rendering model and the texture map data; and projecting the three-dimensional image onto a two-dimensional screen, wherein the projecting the three-dimensional image onto a two-dimensional screen further comprises:

monitoring whether a size of a presentation region for playing the panoramic video has changed, in determining that the size of the presentation region has changed, obtaining a changed size of the presentation region, and adjusting a size of a rendering canvas and updating a projection matrix of the perspective camera based on the changed size.

16. The non-transitory computer-readable storage medium according to claim 15, wherein the determining a viewpoint region based on a field of view of a perspective camera comprises:
    obtaining a field-of-view range of the perspective camera and a preset field-of-view threshold; and
    determining the viewpoint region by adding a region indicated by the preset field-of-view threshold surrounding a region indicated by the field-of-view range.

17. The non-transitory computer-readable storage medium according to claim 15, wherein the projecting the three-dimensional image onto a two-dimensional screen comprises:
    monitoring an interactive operation corresponding to a predetermined interaction manner associated with a client computing device;
    recording a two-dimensional offset generated by the interactive operation;
    converting the two-dimensional offset into an offset angle of the three-dimensional image in the spherical rendering model; and
    updating a projection matrix of the perspective camera based on the offset angle.

18. The non-transitory computer-readable storage medium according to claim 15, wherein the rendering image pixels outside the viewpoint region at a lower resolution than rendering image pixels within the viewpoint region comprises:
    setting a first resolution in preset resolution levels for playing the panoramic video;
    rendering the image pixels within the viewpoint region at the first resolution to generate first texture map data;
    determining a second resolution in the preset resolution levels, wherein the second resolution is one level lower than the first resolution; and
    rendering the image pixels outside the viewpoint region at the second resolution to generate second texture map data.

19. The non-transitory computer-readable storage medium according to claim 15, wherein the adjusting a size of a rendering canvas comprises:
    setting the rendering canvas to a same size as the changed size of the presentation region.

20. The non-transitory computer-readable storage medium according to claim 15, wherein after the obtaining a current frame of image from a video source, the operations further comprise:
    determining whether the current frame of image needs to be rendered based on a preset performance detection parameter; and
    in response to determining that the current frame of image does not need to be rendered, skipping the current frame of image and continuing to obtain a next frame of image.

* * * * *